C. F. DAVIS.
MACHINE FOR SEALING AND STAMPING ENVELOPS.
APPLICATION FILED AUG. 9, 1906.

930,737.

Patented Aug. 10, 1909.
8 SHEETS—SHEET 2.

Witnesses.
A. H. Whatley.
L. K. Seagrave Jr.

Inventor.
Charles F. Davis
By Horatio E. Bellows
Attorney.

C. F. DAVIS.
MACHINE FOR SEALING AND STAMPING ENVELOPS.
APPLICATION FILED AUG. 9, 1906.

930,737.

Patented Aug. 10, 1909.
8 SHEETS—SHEET 3.

Fig. 3

Witnesses.
A. H. Whatley.
L. K. Seagrave Jr.

Inventor.
Charles F. Davis
By Horatio E. Bellows
Attorney.

C. F. DAVIS.
MACHINE FOR SEALING AND STAMPING ENVELOPS.
APPLICATION FILED AUG. 9, 1906.

930,737.

Patented Aug. 10, 1909.
8 SHEETS—SHEET 4.

Witnesses.
A. H. Whatley.
L. K. Seagrave Jr.

Inventor.
Charles F. Davis
By Horatio E. Bellows
Attorney.

C. F. DAVIS.
MACHINE FOR SEALING AND STAMPING ENVELOPS.
APPLICATION FILED AUG. 9, 1906.

930,737.

Patented Aug. 10, 1909.
8 SHEETS—SHEET 7.

Witnesses.
A. H. Whatley.
L. K. Seagrave Jr.

Inventor.
Charles F Davis
By Ignatius E. Bellows
Attorney

C. F. DAVIS.
MACHINE FOR SEALING AND STAMPING ENVELOPS.
APPLICATION FILED AUG. 9, 1906.

930,737.

Patented Aug. 10, 1909.
8 SHEETS—SHEET 8.

Inventor:
Charles F Davis

Witnesses:
R. A. Bowen
R. R. Bond

By Horates E. Bellows,
Attorney

UNITED STATES PATENT OFFICE.

CHARLES F. DAVIS, OF PROVIDENCE, RHODE ISLAND, ASSIGNOR TO AUTOMATIC ENVELOPE SEALING AND STAMPING MACHINE COMPANY, A CORPORATION OF RHODE ISLAND.

MACHINE FOR SEALING AND STAMPING ENVELOPS.

No. 930,737.          Specification of Letters Patent.          Patented Aug. 10, 1909.

Application filed August 9, 1906. Serial No. 329,869.

*To all whom it may concern:*

Be it known that I, CHARLES F. DAVIS, a citizen of the United States, residing at Providence, in the county of Providence and State of Rhode Island, have invented certain new and useful Improvements in Machines for Sealing and Stamping Envelops, of which the following is a specification, reference being had therein to the accompanying drawing.

My invention relates to machines for automatically sealing and stamping envelops and other receptacles, and has for its objects the ends commonly sought in such machinery.

The invention consists essentially of a novel means of engaging, conveying, and discharging the envelop during the sealing operation; a novel means for moistening the flap and envelop surface, means for regulating the height of the stamp sheets or strips to be severed; the employment of suction means for advancing the stamp strips to the detaching mechanism; suitable means for initially supporting the stamp to be detached preparatory to the descent of the stamp affixing plunger; means for registering the stamp for cutting; and a clutch mechanism operated by the envelop margin for actuating the stamp affixing mechanism.

Further novel parts and combinations will be hereinafter set forth and claimed.

In the accompanying drawings, constituting a part of this specification, and wherein like reference characters indicate like parts throughout the views.

The framework of my machine may be of any form of construction suitable for carrying the several details of mechanism. In the form thereof herein shown it consists essentially of a casing, 1, for the sealing mechanism, and a frame or casing, 2, for the stamp affixing mechanism.

Figure 6:
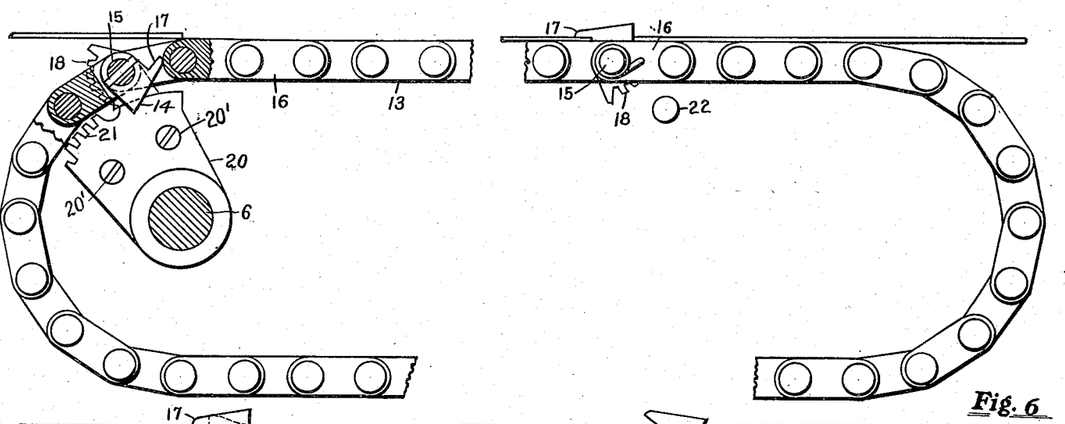
Figs. 6 and 7, side elevations of the chain partially in section on line *c c* of Fig. 2 showing portions of the chain broken away.
Figure 7:
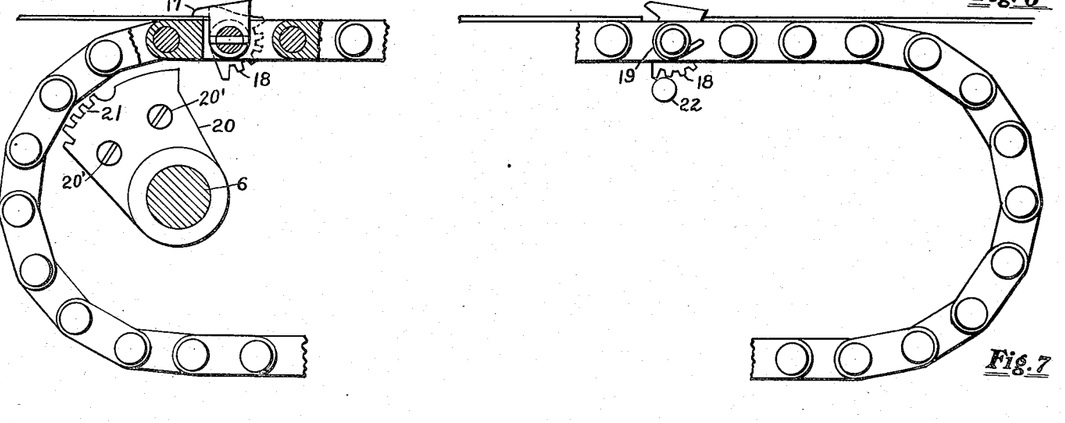

The envelop sealing and moistening mechanism includes the casing, 1, provided with a shelf, 3, elevated above and parallel to the casing top or runway, 5. Mounted in the casing walls at either end are shafts, 6 and 7, carrying respectively sprocket wheels, 8 and 9. The shaft, 6, is provided with a crank, 10, or, when driven by power, a pulley. Engaging the teeth, 11 and 12, of the respective sprocket wheels is a sprocket or carrier chain, 13, provided at intervals with gripping devices for engaging the envelop to be operated upon. In detail these devices consist, as shown in Fig. 6, of irregular plates, 14, pivoted upon transverse pins 15, in the links, 16. Each plate has a marginal projecting finger, 17, and a toothed segment, 18, upon its opposite margin. The finger is normally depressed against its adjacent link by a spiral spring, 19, whose ends are fixed in the pivot pin, 15, and link plate, 16. Loosely mounted on shaft, 6, and fixed to the casing wall by screws, 20', is a segment, 20, having teeth, 21, adapted to engage the teeth, 18, of the gripper plates, 14, and depress the fingers, 17, into engaged position. In such position the segment, 18, projects below the chain and is adapted in its travel to contact with and be tripped by a pin, 22, fixed in the side of the casing.

Figures 1, 8, 9:
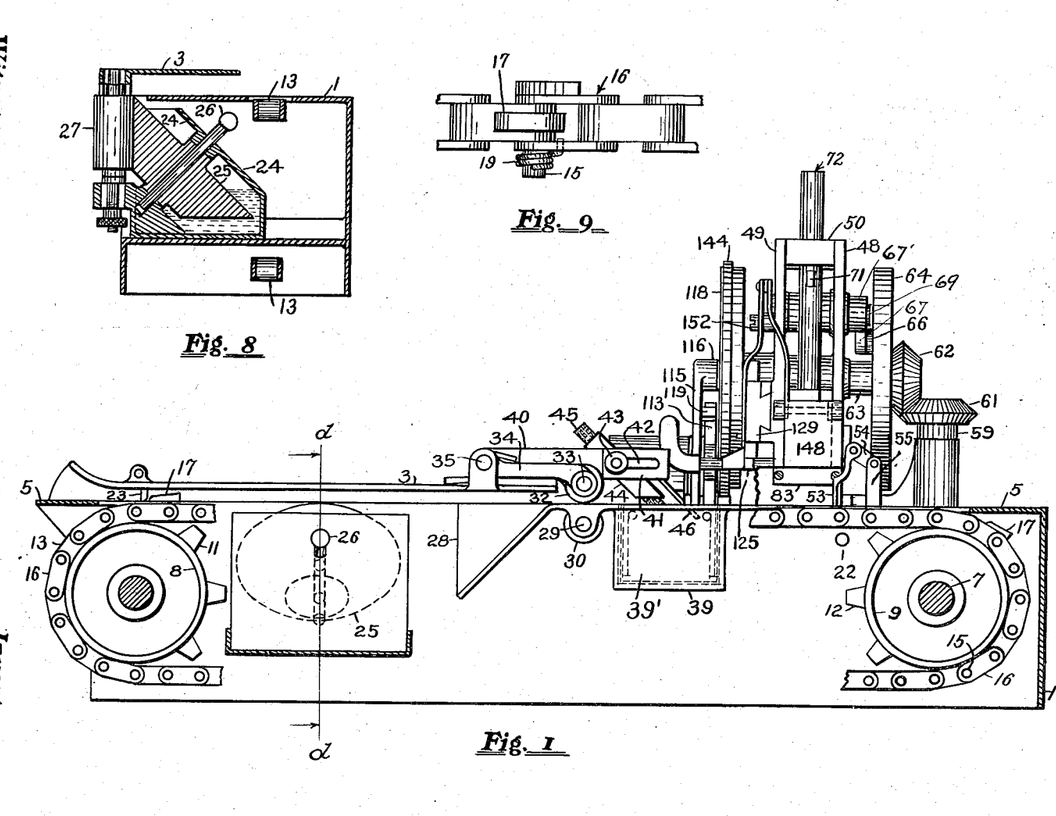
Figures 1, 2 and 3 are front, plan and side elevations respectively of a sealing and stamping machine embodying my invention.
Fig. 8, a transverse section of the machine on line *d d* of Fig. 1.
Fig. 9, a plan view of a section of the conveyer chain.

Hinged in the shelf, 3, above the wheel, 8, is a pendent registering finger, 23. Adjacent said wheel is a reservoir, 24, for liquid, shown in detail in Fig. 8. A frusto conical moistening roller, 25, is mounted diagonally therein upon a shaft, 26, which is removable to permit withdrawal of the roller for cleansing purposes. This side of the roller contacts with the face of a presser roll, 27, vertically mounted in the rear wall of the casing. A flaring guide plate 28 depends from the run, 5, and adjacent the same are hangers, 29, for the reception of the journals of a lower sealing roll, 30. A companion roll, 32, is rotatably mounted upon a rod, 33, supported by arms, 34, connected by a plate, 34', and fixed to a shaft, 35, journaled in blocks, 36, upon the shelf, 3. The roll, 32, is depressed against roll, 33, by a spiral spring, 37, around the shaft, 35, one of whose ends, 38, rests upon the shelf, and the other end, 38', upon the plate, 34'.

Fixed in the casing adjacent the sealing rolls is a receptacle, 39, containing the liquid or moistening pad, 39'. The moistening device comprises an arm, 40, loosely mounted on the shaft, 35, having a carrier, 41, upon its end provided with a longitudinal slot, 42, to admit a binding screw, 43, which supports an inclined case, 44, carrying a wick, 45, whose lower end normally rests upon the moistening pad, 39'. A downwardly inclined arm, 46, upon the carrier front projects through an opening, 46', in the run, 5.

The stamp affixing mechanism is put into operation through a clutch device and its connections.

Figures 2, 10:
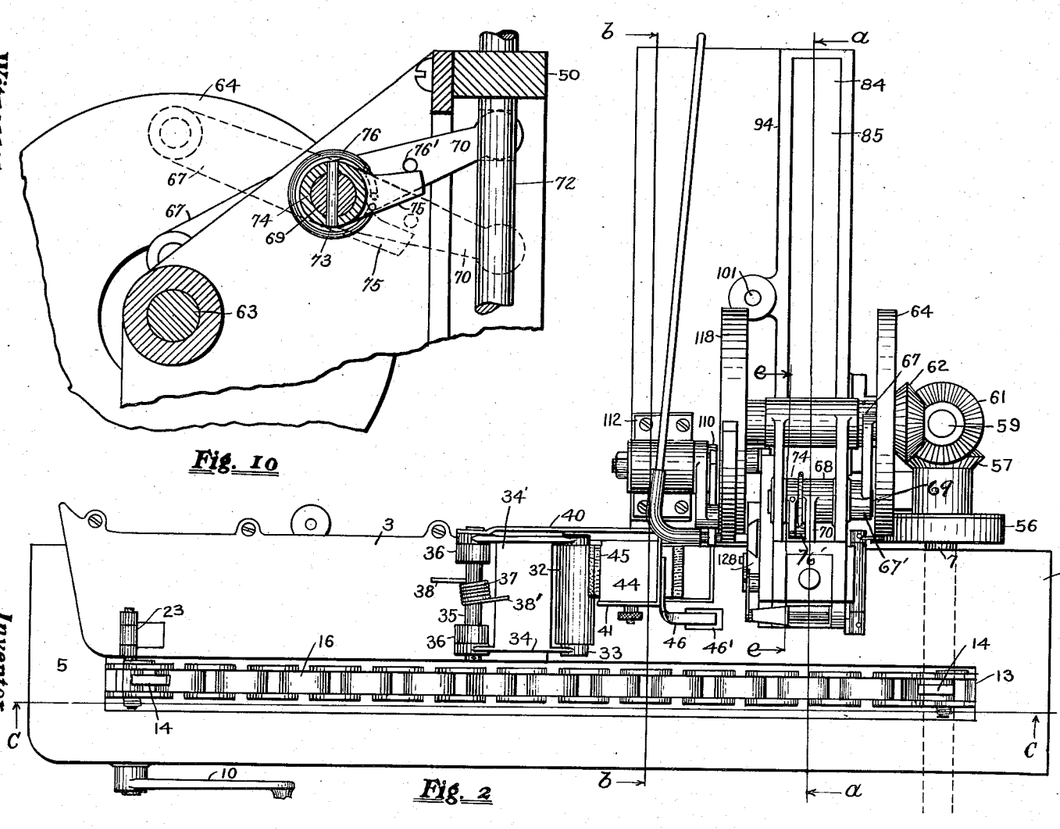
Fig. 10, a partial section on line *e e* of Fig. 2.
Figure 3:
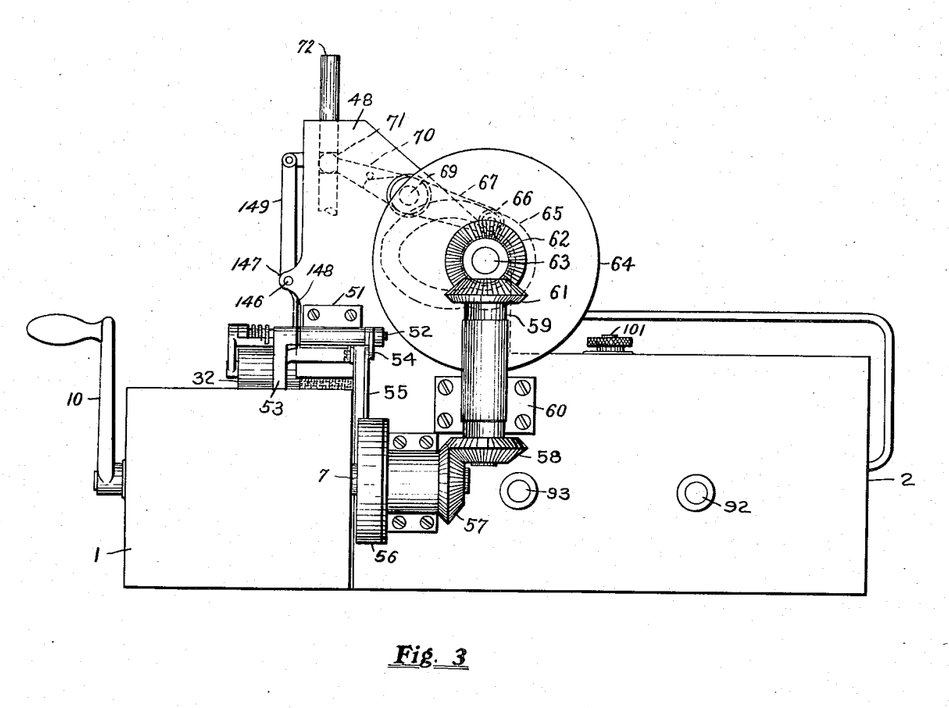

The casing, 2, carries two uprights, 48, 49, connected with guide blocks, 50, 50'. Mounted in a sleeve, 51, upon the side of the standard, 48, is a rock shaft, 52, having a depending finger 53 nearly contacting with the run, 5. The shaft, 52, is connected through link 54 and rod 55 with a roll clutch, 56, on shaft 7, as shown in Fig. 3. A bevel gear, 57, upon said shaft engages gear, 58, upon the lower end of a shaft, 59, vertically mounted in a bearing, 60, upon the frame. The upper end of shaft, 59, carries a gear, 61, which engages a gear, 62, fixed to an operating shaft, 63, mounted in the uprights. On shaft, 63, is a disk, 64, having a cam channel, 65, upon its inner face, wherein travels a stud or roller, 66, upon the end of a lever arm 67 on the sleeve 67' fixed on a shaft 69 in the uprights. Another lever arm 70 projects forwardly from the sleeve 68, loose on said shaft, having its free end resting loosely in a vertical slot 71 in the plunger 72. Adjacent the sleeve 68 upon shaft, 69, is fixed by a pin, 73, a sleeve, 74, as shown in Fig. 10, having an arm, 75. The last mentioned sleeve is inclosed in a spring, 76, one of whose ends is fixed in the arm, 70, and the other end in arm, 75, whereby a downward tension is exerted upon the arm, 70 thus rendering the plunger yielding, as will be hereinafter referred to. A pin, 76', on arm, 70, normally rests upon the end of arm, 75.

Figure 13:
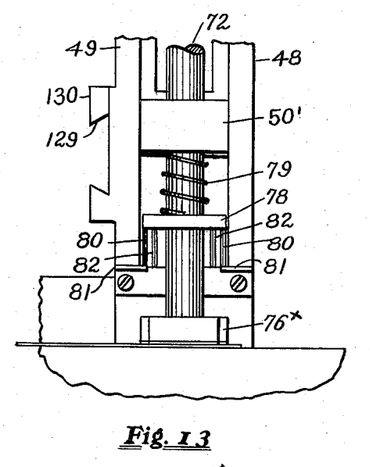
Figs. 13 and 14, front and side elevations of the stamping and shearing devices, and Figs. 15 and 16, similar elevations of the stamp carrier sliding mechanism.
Figure 14:
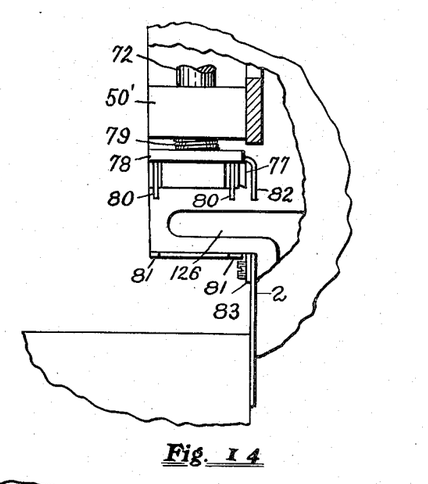

The stamp affixing plunger, 72, slides in the guide blocks, 50, and has on its extremity as shown in Figs. 13 and 14, a presser foot, 76ˣ, having upon its rear side a cutting blade, 77. Sliding upon the plunger rod, 72, below the guide block, 50', is a holding plate, 78, normally pressed against the presser foot by a compression spring, 79, which bears against the guide block and holding plate. The latter has upon its four corners vertical fingers, 80, extending below the plane of the presser foot and in vertical alinement with inwardly directed lugs, 81, upon the lower margins of the uprights. Two pins, 82, extend downwardly from the rear of the holding plate in alinement with the forward wall of the casing, 2. A second cutting blade, 83, is fixed to the casing to coact with blade, 77, in shearing the stamps when the presser foot is depressed.

Figure 4:
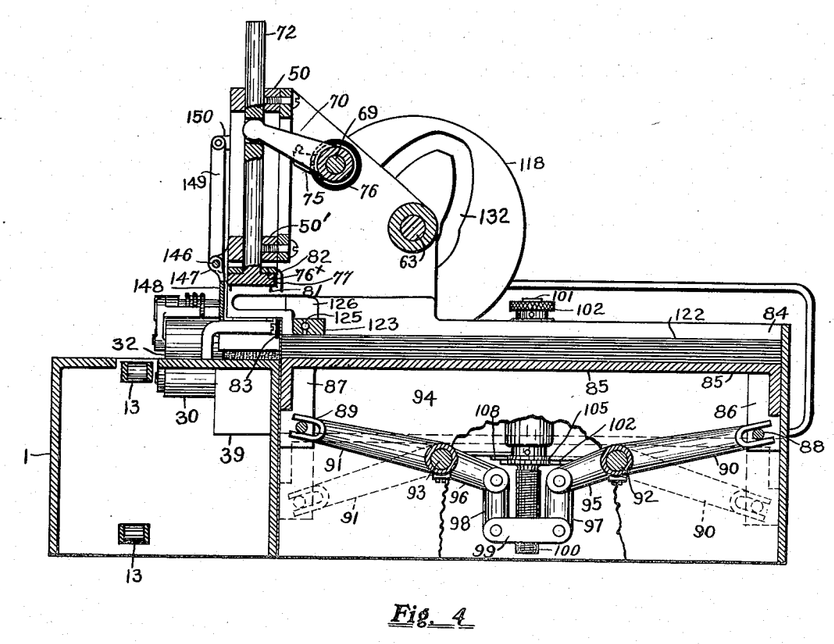
Figs. 4 and 5, sections of the same on lines *a a* and *b b* respectively of Fig. 2.
Figures 5, 11, 12:
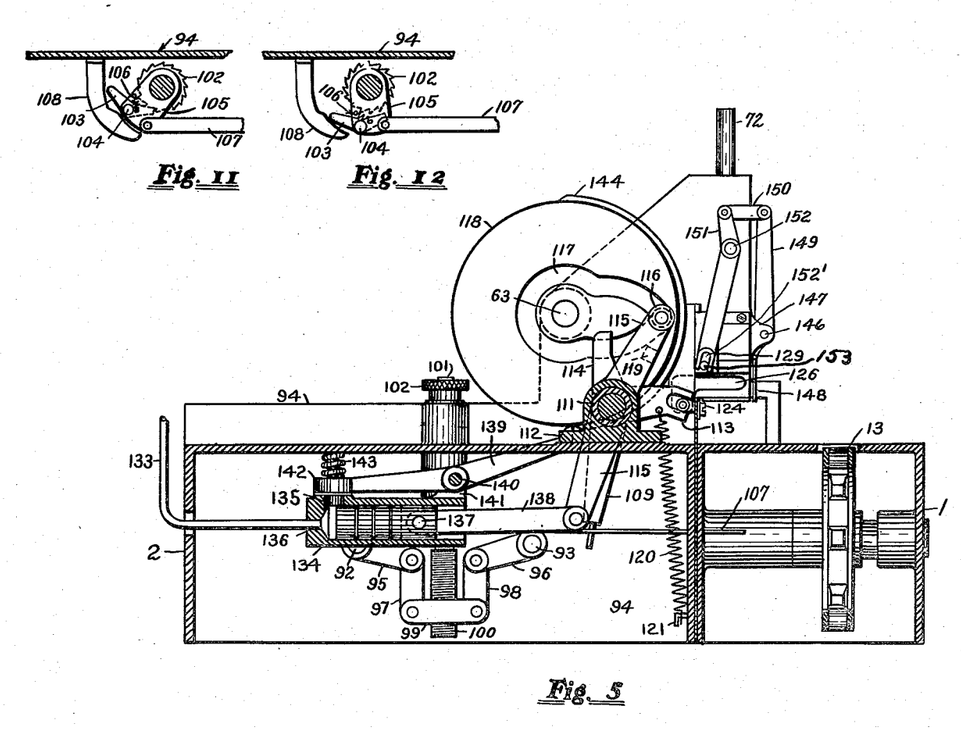
Figs. 11 and 12, detail views of the pawl and ratchet mechanism.

The receptacle for holding the sheets of stamps, as shown in Fig. 4, comprises a magazine, 84, in the casing, 2, provided with a vertically movable floor or platform, 85, upon whose ends are guide plates, 86 and 87, sliding against the end walls of the casing, and provided respectively with lateral studs, 88 and 89, engaged in the bifurcated outer ends of lever arms, 90 and 91, fixed respectively to shafts, 92 and 93, journaled in a wall of the casing and a partition, 94, through which their ends project. The partition forms one wall of the magazine, 84, already referred to. Fixed to the ends of shafts, 92 and 93, are arms, 95 and 96, connected by links, 97 and 98, respectively, to a nut, 99, engaging the threads, 100, of a screw rod, 101, traversing the top of the casing, and provided with a milled nut, 102, upon its upper end, whereby the platform, 85, may be manually elevated or depressed. This platform is automatically elevated by the following mechanism shown in Figs. 4, 5, 11 and 12. Fixed upon the screw rod, 101, is a ratchet wheel, 102, whose teeth are engaged by a pawl, 103, pivoted by a pin, 104, to a movable plate, 105, which is in turn pivoted on the shaft, 101, adjacent the ratchet wheel. The nose of the pawl is normally pressed against the ratchet by a spring, 106. The plate, 105, is oscillated by a horizontally reciprocating rod, 107, pivoted thereto, and traversing the forward casing wall. A curved tripping finger, 108, is fixed to the partition wall, 94, in the path of the tail of the pawl whereby, after the forward oscillation of the plate, 105, as shown in Fig. 12, the nose of the pawl is drawn out of contact with the ratchet. Thus, intermittent rotation is imparted to the screw rod, 101. If, however, the rod, 107, does not retreat to a point in the rear of the ratchet, the pawl nose will not contact therewith, and no movement will be imparted to the platform. The bar, 107, is reciprocated through a downwardly directed arm, 109, upon a plate, 110, fixed to a shaft, 111, journaled in a bearing, 112, on the machine casing. This plate has also a forwardly projecting bifurcated arm, 113, and an upwardly directed arm, 114. Pivotally mounted midway its ends on the shaft, 111, adjacent the arm, 114, is a lever, 115, provided upon its upper end with a cam roll, 116, which moves in a channel, 117, in the outer face of a cam disk, 118, mounted on the end of shaft, 63. On the arm, 115, is a lug, 119, adapted, when said arm travels rearward, to strike arm, 114, and thereby raise the arm, 113, and advance the arm, 109. The last mentioned arm is rearwardly impelled by the retractile spring, 120, which connects the arm, 113, with a pin, 121, fixed to the forward wall of the casing. The extent of travel of the rod, 107, is measured by the distance that the arm, 109, is permitted to move rearwardly, and if the arm, 113, be for any reason impeded in its downward swing, the rod, 107, will not reach a sufficiently rearward point to engage the ratchet wheel, 102, and the platform will remain stationary.

Figures 15, 16:
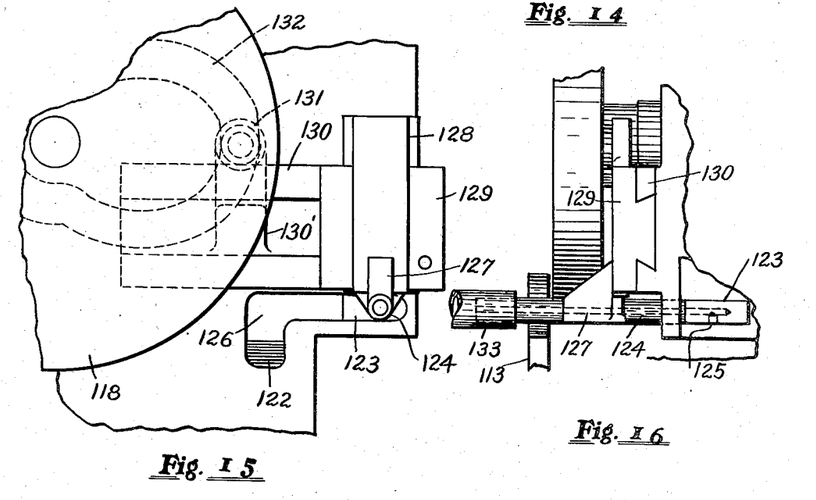
Figure 17:
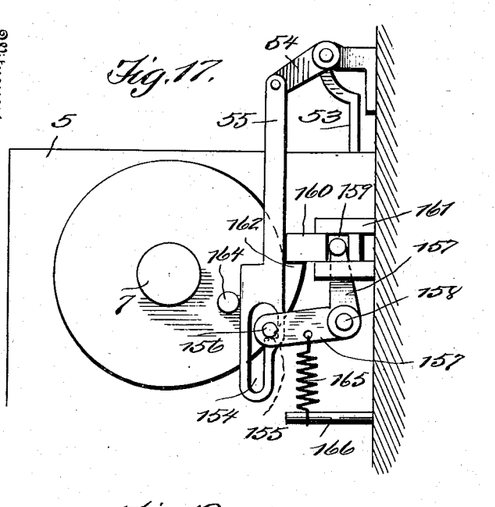
Fig. 17 is a view looking from a position in the rear of the machine.

The stamps to be affixed to the envelops are inserted preferably in the form of superimposed strips, 122, in the magazine, 84, and the top strip thereof is fed to the shearing blades, 77 and 83, by the following mechanism shown in Figs. 15 and 16. A horizontal carrier plate, 123, mounted upon the end of a metallic tube, 124, reciprocates in the magazine. A passage, 125, in the plate leads from the end of the tube to the lower face of the carrier plate. The tube slides in an L-shaped slot, 126, in the upright, 49, and has an enlarged portion, 127, comprising a vertical slide, 128, which moves in a guide block, 129, slidably mounted in a dovetailed guide, 130, upon the upright, 49. Upon the block or plate, 129, is an upright arm, 130', carrying stud or cam roller, 131, registering in a cam channel, 132, upon the inner face of the disk, 118, by which, through the described sliding mechanism, the carrier plate, 123, is horizontally reciprocated. At the end of its rearward reciprocation the tube, 124, enters the bifurcated arm, 113, and is thereby first downwardly and then upwardly moved. Fixed to the outer end of the tube, 124, is a flexible tube, 133, which, passing through the casing, 2, communicates with a suction pump shown in detail in Fig. 5. The pump may be of any convenient type. The construction herein described comprises the usual cylinder, 134, mounted upon the inner wall of the casing, 2, and provided with an exhaust vent, 135, and an opening, 136, for receiving the tube or pipe, 133. The piston, 137, is connected by its rod, 138, to the lower end of lever, 115, through which said rod is operated. A lever, 139, is pivoted upon a pin, 140, in lugs, 141, upon the cylinder. The outer end of the lever is enlarged at 142, and is normally pressed upon the vent, 135, by a compression spring, 143, intermediate the casing roof and the lever. The inner end of the lever is in the path of a cam strip or shoulder, 144, upon the periphery of the disk, 118, whereby the vent is intermittently opened and closed. The forward movement of the piston rod, 138, creates a partial vacuum in the pump which through the tubes, 133, 124, and the passage, 125, causes the stamp to adhere to the carrier, 123, during the carrier's upward and forward travel, whereupon the cam strip 144, breaks the vacuum through the vent, 135, and releases the stamp preparatory to the return of the carrier for another charge.

In order to make the stamp strip, 122, correctly register with the cutting blades after the strip has been advanced by the carrier, the following device is employed. A bar, 146, is fixed in lugs, 147, upon the forward lower margins of the uprights upon which is pivoted a vertical registering plate, 148, whose lower margin is in alinement with the upper stamp strip. An integral arm, 149, projects upwardly and rearwardly from the plate, 148, and is connected by a link, 150, to the top of a lever, 151, pivoted to a stud, 152, upon the upright, 49. The lower end of the lever, 151, is bifurcated at 152', whereby it engages a pin, 153, upon the face of the guide block, 129. When, therefore, the block, 129, and its carrier plate, 124, is in advanced position, the lower margin of the plate, 148, will be some distance away from the supports, 48 and 49; and when the block retreats the registering plate, 148, will swing back against the standards.

The lower end of the bar, 55, is slotted, at 154, having a hook or shoulder, 155 upon one side. Normally resting upon the shoulder 155 of the slot, 154, is the pin, 156 upon the extremity of a bell crank lever, 157, pivoted by a pin, 158 to a frame of the machine. The upper end of the crank engages a slot, 159 in a sliding block, 160 mounted horizontally in a guide-way 161 on the frame of the machine. The block, 160 is actuated through the described mechanism by an envelop which moves finger, 53, thereby raising the slot, 154, which in turn raises the lower member of the bell crank lever, 157 and withdraws the block, 160 out of engagement with the projection, 162 upon the periphery of the roll cage, 163 whereby the cage is permitted to rotate slightly to engage the clutch. It is necessary that the block, 160 resume its normal position in line of travel of the projection 162 before the latter has completed a revolution, so as to make one revolution of the stamp affixing mechanism, and then stop until another envelop is fed into the machine. This is attained by the following means; Upon the external face of the cage, 163, is a pin, 164, which in its path of travel strikes the side of bar, 55, and throws the shoulder, 155 out of supporting engagement with the pin, 156, whereby the lower arm of the bell crank lever, 157 is downwardly pulled by the spring, 165, connected to the bell crank lever 157 and some fixed member 166. After the envelop has, in its travel, passed beyond the finger, 53, the latter and the members 54 and 55 drop to their normal position, and 55 is free to swing outwardly and into reinforcement with the pin 156.

Figures 18, 20:
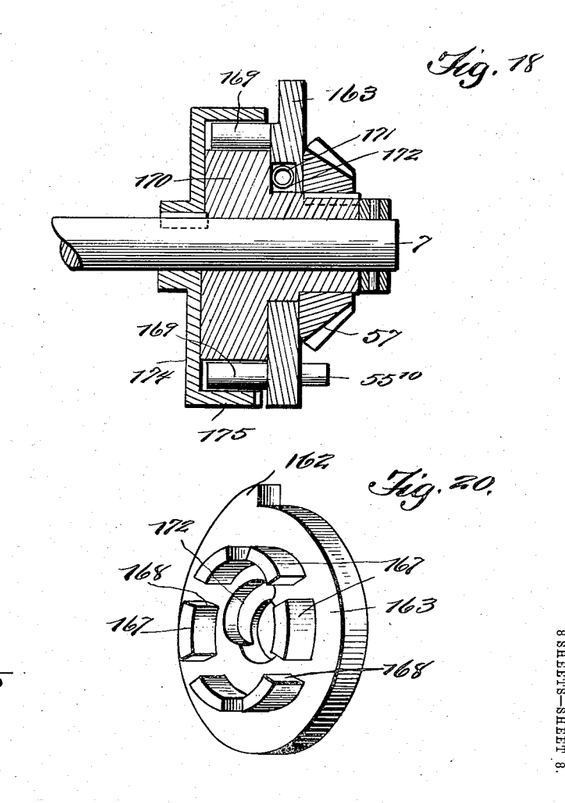
Fig. 18 is a substantially central longitudinal section through the roll clutch.
Fig. 20 is a perspective view of the interior of the cage.
Figure 19:
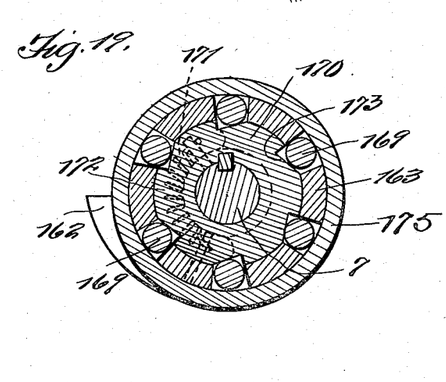
Fig. 19 is a cross section thereof.

Figs. 18, 19 and 20 show the interior of an efficient form of roll clutch. 163 is the cage provided with segments, 175, and intermediate seats, 168, which contain the rolls, 169. This cage is mounted loosely on the clutch body, 170, which is also loose on shaft, 7, and to which is keyed the gear, 57, and is caused to rotate therewith by means of spring, 171, mounted in a segmental slot, 172, within the cage, 163. One end of said spring is fastened to the clutch body and the other to the cage. Upon the periphery of the body, 170, are angular flat spaces or seats, 173, in which the rolls, 169, rest when the clutch is disengaged. Fixed to the shaft, 7, is the clutch driving mechanism, 174, whose flange, 175, incloses the rolls, 169, and case segments, 167.

The operation of the clutch is as follows:—When projection, 162, is released, the spring, 171, rotates the cage, 163, thereby forcing the rolls, 169, into engagement with driving member flange, 175, and also into engagement with the angular seats, 173, of the clutch body, 170. Thus the parts are bound and rotate together with shaft, 7, until the projection, 162, again contacts with its stop block, 160. When this contact occurs, the roll cage, 163, is forced backward, and the rolls, 169, are disengaged, whereby the clutch body, 170, and gear, 57, come to a state of rest.

The operation of the described machine is as follows: The envelop to be operated upon is placed on the left end of the runway 5, with the flap projecting downwardly at right angles to the envelop body, and is manually advanced until its forward end contacts with the registering pin, 23, in which position the said edge is seized by the gripping finger, 17, which advances the envelop; the flap passing between the moistening roller, 25, and presser roll, 27, and thereafter contacting with the flaring plate, 28, whereby the flap is brought parallel with the envelop body and tightly pressed into engagement therewith by the presser rolls, 30 and 32. The envelop then passes beneath the wick, 45, by which its surface is moistened until the forward edge contacts with and elevates the arm, 46, whereby the wick is raised out of contact with the envelop surface. The advancing envelop strikes the finger, 53, at which instant the tripping pin, 22, rotates the plate, 14, thereby raising the gripping finger, 17, and releasing the envelop to be operated upon by the stamping mechanism. The shoulder of the still advancing gripper pushes the previously stamped envelop along and off the right hand end of the platform. The contact of the sealed envelop with the finger, 53, puts into operation, through the link, 54, and rod, 55, the clutch, 56; thereby starting the stamp feeding and affixing mechanism through the gears, 57, 58, shaft, 59, gears, 61, 62, and operating shaft, 63. The uppermost strip of the superimposed stamp strips, 122, resting in the magazine, 84, is intermittently advanced to the affixing mechanism by the carrier plate, 123, which in its lowest rear position rests upon the strip as shown in Fig. 4. The latter is forced by the suction of the pump into adhesion with the carrier plate, through the passage, 125, and tubes, 124 and 133. At the end of the forward movement of the carrier plate the vacuum is broken in the pump by the movement of the lever arm, 142, and the strip is released, below the presser foot, 76×. The forward momentum of the stamp strip imparted by carrier plate carries the strip forward against the lower inner margin of the registering plate, 148, which at that instant is some distance away from the supports, but which immediately swings against the supports, thereby pushing the stamp strip slightly back, so that the perforations of the stamp are registered in exact vertical alinement with the shearing knives, 77 and 83. After the stamp has been thus registered or adjusted, its margins rest upon the lugs, 81, and the forward wall of the casing, 2. Thereupon the descending plunger, 72, permits the fingers, 80, of the holding plate, 78, to be forced by the spring, 79, down upon the margins of the stamp, whereby the latter is held in a perfect horizontal plane. The pins, 82, at the same time press upon the stamp strip in the rear of the stamp perforations. In the described position the stamp is held in a manner to insure a clear shearing of the stamp. The continued descent of the presser foot, 76×, brings the blades, 77 and 83, into contact to sever the stamp at its line of perforations, and the detached stamp is affixed to the moistened corner of the envelop by the continued descent of the presser foot. When an unusually thick envelop is inserted beneath the presser foot, binding is avoided by virtue of the yielding character of the plunger, 72, through the spring pressed arm, 70. In such case, the arms, 70 and 75, assume, at the close of the plunger's descent, the relative positions shown in broken lines in Fig. 10.

When the magazine, 84, is first filled some time elapses before the upper sheets are removed sufficiently to permit any extended descent of the carrier plate, 123, during its reciprocations. Therefore, its tube during such time does not depress the arm, 113. The result is that the pawl and ratchet mechanism is not operated by the rod, 107, and the magazine platform, 85, remains stationary, until a predetermined point is reached in the descent of the carrier plate, whereupon the floor begins its automatic upward movement.

While for the purpose of illustration the strips operated upon have been preferably shown in strip form, it is obvious that the machine is equally adapted to feed and affix a pack of individual stamps.

The features not herein claimed will be made the subject-matter of a separate application.

What I claim is,

1. In a machine of the type set forth the combination with the flap moistening device, the flap folding device, the sealing device, and the device for moistening the face of the envelop, of a carrier chain movable in relation to each of said devices successively, a plate pivotally mounted in the chain, a finger in the plate extending above the chain, means for pressing the finger into contact with the chain, and means for moving the chain.

2. In a machine of the type set forth the combination with a runway and a flap moistening device, a flap folding device, a sealing device, and a device for moistening the face of an envelop, mounted adjacent the runway to coöperate with the same, of grippers, and means for imparting a continuous rectilinear movement to the grippers to feed the envelop along the runway.

3. In a machine of the type set forth the combination with the runway of a moistening pad mounted in the runway, a moistener held upon the pad solely by gravity and a member in advance of said moistener in the path of the envelop for elevating the moistener.

4. In a machine of the type set forth the combination with the runway, and sealing devices mounted adjacent the runway to coöperate with the same, of a device for moistening the face of the envelop, and means for moving the envelop through the sealing device and in contact with the moistening device and means movable with and in advance of the latter for elevating the same by contact of the envelop therewith.

5. In a machine of the type set forth the combination with the runway and an overhanging shelf, of a moistening pad in the runway, a carrier pivotally mounted upon the shelf, and a moistening wick in the carrier contacting with the pad and an inclined member on the carrier in advance of the wick and in the path of the envelop.

6. In a machine of the type set forth the combination with the runway and an overhanging shelf, of a moistening pad in the runway, a carrier pivotally mounted on the shelf, a moistening wick in the carrier contacting with the pad, and an inclined member on the carrier in advance of the wick and in the path of the envelop and means for vertically adjusting the wick.

7. In a machine of the type set forth the combination with the runway and an overhanging shelf, of a moistening pad in the runway, a carrier pivotally mounted on the shelf, a moistening wick in the carrier contacting with the pad, and an inclined member on the carrier in advance of the wick and in the path of the envelop and means for longitudinally adjusting the wick.

8. In a machine of the type set forth the combination with the runway and an overhanging shelf, of a moistening pad in the runway, a carrier pivoted at one end on the shelf, a downwardly projecting moistening wick normally contacting with the face of the pad, and a downwardly inclined arm upon the carrier whose extremity is below the plane of the face of the pad.

9. In a machine of the type set forth, the combination with the runway, and sealing and moistening devices mounted adjacent said runway to coöperate with the same, of a stamp affixing mechanism also mounted adjacent the runway and in coöperative relation thereto, means for actuating the stamp affixing mechanism, a carrier chain adapted to present the envelop successively to the sealing and moistening devices and to the stamp affixing mechanism, and means for operating the carrier chain.

10. In a machine of the type set forth, the combination with the runway, and sealing and moistening devices mounted adjacent the runway to coöperate with the same, of a stamp affixing mechanism also mounted adjacent the runway in coöperative relation thereto, a carrier chain adapted to present the envelop successively to the sealing and moistening devices and to the stamp affixing mechanism, and means for operating the carrier chain for actuating the stamp affixing mechanism.

11. In a machine of the type set forth the combination with the runway, and sealing and moistening devices adjacent thereto and coöperative therewith, of a stamp affixing mechanism also mounted adjacent the runway and in coöperative relation therewith, a carrier chain adapted to present the envelop successively to the sealing and moistening devices and to the stamp affixing mechanism, means for operating the carrier chain, operative connections between the chain and stamp affixing mechanism, and means actuated by the carrier chain operating means for intermittently throwing the stamp affixing mechanism into and out of operation.

12. In a machine of the type set forth the combination with a stamp affixing mechanism of a carrier chain for feeding the envelops to said mechanism, operative connections between the chain and said stamp affixing mechanism, and a clutch device operatively connected with the carrier chain for throwing the stamp affixing mechanism into and out of operation.

13. In a machine of the type set forth the combination with an envelop carrying mechanism, of a flap folding device, a flap sealing mechanism, a moistening mechanism adapted to operate upon the envelop face, and a stamp feeding and affixing mechanism, and a carrier chain adapted to present the envelop successively to the sealing and moistening devices and to the stamp affixing mechanism all of said mechanisms having operative connection with the envelop carrying mechanism whereby they are relatively operated.

14. In a machine of the type set forth, the combination with a vertically movable platform for supporting the stamp strips, mechanism for elevating the platform, a shearing device, means for feeding the stamp strip in the direction of said device, means controlled by the feeding mechanism for throwing into operation the platform elevating device only after a predetermined point is reached in the descent of the carrier plate, and a label affixing mechanism.

15. In a machine of the type set forth, the combination with a stamp affixing mechanism, a carrier plate and means for giving the same an upward and forward movement, of suctional means including a piston for retaining the stamp in engagement with the carrier plate during the upward and forward travel of the carrier, a cam disk, means actuated thereby and pivotally connected with said piston for controlling the suction, and rocking means also controlled by said disk for controlling the exhaust vent from the suction device.

16. In a machine of the type set forth the combination with stamp affixing mechanism, automatically operated by the advancing envelop, a carrier plate provided with a passage leading to its face, of means for reciprocating the plate, and means connected with the operating shaft for exhausting the air through said passage during a portion of the reciprocation of said plate and automatically actuated means for controlling the exhaust vent from the exhaust cylinder.

17. In a machine of the type set forth the combination with stamp affixing mechanism, automatically operated by the advancing envelop, a carrier plate provided with an opening in its face, of means for advancing and withdrawing the plate, means for creating a vacuum through said opening during the advance of said plate, and means connected with the operating shaft for breaking the vacuum during the withdrawal of the plate said vacuum breaking means being operatively connected with the vacuum creating device.

18. In a machine of the type set forth the combination with stamp affixing mechanism, automatically operated by the advancing envelop, a reciprocating carrier plate provided with an opening in its face, of means for reciprocating the plate, an air pump, a tube connecting the air pump with said opening, and means connected with the operating shaft for operating the air pump and an automatically actuated device for controlling the exhaust vent of said pump.

19. In a machine of the type set forth the combination with stamp affixing mechanism, automatically operated by the advancing envelop, a reciprocating carrier plate provided with an opening in its face, of means for reciprocating the plate, an air pump, a tube connecting the air pump with said opening, and means connected with the operating shaft for operating the reciprocating means actuating the pump and an automatically actuated device for controlling the exhaust vent of said pump.

20. In a machine of the type set forth the combination with the platform, of means in front of the platform for temporarily supporting a stamp in a horizontal plane, a carrier plate for feeding the stamp forward from the platform to the supporting means, means for reciprocating the carrier plate, the holding plate having fingers at the corners, a reciprocating presser foot adapted to traverse the supporting means and affix the exposed stamp, means for actuating the presser foot, and lugs beneath which said presser foot is mounted to move and with which said fingers are adapted to coöperate.

21. In a machine of the type set forth the combination with the platform and stamp feeding mechanism, of rectangularly disposed supporting lugs lying in a horizontal plane, and located in front of the platform, a vertically movable plunger, a presser foot upon the end of the plunger adapted to descend intermediate the lugs, a shearing knife upon the inner margin of the plunger, a holding plate yieldingly mounted upon the plunger, fingers upon the holding plate, normally projecting below the face of the presser foot and in vertical alinement with the lugs, and means for reciprocating the plunger.

22. In a machine of the type set forth the combination with the uprights, of lugs upon the uprights, guide blocks between the uprights, a plunger mounted in the blocks, a presser foot upon the end of the plunger, a holding plate loosely mounted on the plunger and normally resting upon the presser foot, fingers upon the plate projecting below the face of the presser foot and in alinement with the lugs, a spring pressing against the plate and one of the guide blocks, and means for moving the presser foot below the plane of the lugs.

23. In a machine of the type set forth the combination with the casing, of uprights upon the casing, lugs upon the uprights, guide blocks between the uprights, a knife fixed upon the casing in horizontal alinement with said lugs, a vertically reciprocating plunger mounted in the guide blocks, a presser foot upon the end of the plunger, a shearing knife upon the presser foot in vertical alinement with fixed knife, a holding plate loosely mounted on the plunger above the presser foot, fingers on the plate projecting below the face of the presser foot and in alinement with the lugs, a spring pressing against the plate and one of the guide blocks, and means for reciprocating the presser foot above and below the horizontal plane of the lugs and fixed knife.

24. In a machine of the type set forth the combination with stamp affixing means, a magazine platform, devices for supporting the advanced end of perforated stamp strip, and the shearing knives between the platform and supporting devices, of means for feeding the strip to the supporting means, and means for pushing the advanced strip rearwardly to register the stamp perforations with the shearing knives.

25. In a machine of the type set forth the combination with stamp affixing means, the shearing knife, the device for feeding the stamp strip toward the knife, and means for actuating the feeding device, of a pivoted registering plate, and means for swinging the registering plate actuated by the feeding actuating means.

26. In a machine of the type set forth the combination with the uprights, of an operating shaft mounted in the uprights, a cam disk provided with a channel fixed to said shaft, a second shaft loosely mounted in the uprights, a sleeve upon the second shaft, a rear arm on said sleeve, a cam roller on said arm registering in the channel, a front arm, a lateral stud upon the front arm, a stamp affixing plunger mounted in the uprights and provided with an oblong slot to receive the front arm, a sleeve fixed to the second shaft, and an arm fixed to the sleeve and upon which the stud rests.

27. In a sealing and stamping machine, the combination of envelop moistening and sealing mechanism, a stamp carrier, and mechanism to affix a stamp to each advancing envelop, said stamp affixing mechanism automatically operated by the advancing envelop.

28. In an envelop sealing and stamping machine, the combination of an envelop moistening and sealing mechanism, means for feeding the envelops through the machine, stamp affixing mechanism automatically controlled by the advancing envelops, and moistening means coöperating therewith.

29. In a machine of the type set forth, the combination with the uprights, of an operating shaft mounted therein, a cam disk fixed to said shaft and provided with a channel, a second shaft loosely mounted in said uprights, an arm loosely mounted on the second shaft, a cam roller on said arm, a second arm loosely mounted on said shaft, a stamp affixing plunger mounted in said uprights, and provided with a slot receiving one of said arms, and yielding means coöperating with said plunger.

30. In a machine of the type set forth, the combination with a slidable stamp affixing plunger, a shearing knife adjacent the plunger and coöperating therewith, the device for feeding the stamp strip toward the knife, and means for actuating the feeding device, of means actuated by the feed and plunger actuating means for registering the stamp perforations with respect to the shearing knife after the feeding operation.

31. In a machine of the type set forth, the combination with stamp affixing means, a shearing knife, the device for feeding the end of the stamp strip forwardly and beyond the knife, and means for actuating the feeding device, of means actuated by the feed actuating means for rearwardly registering the stamp perforations with respect to the shearing knife.

32. In a machine of the type set forth, the combination with stamp affixing means, a shearing knife, the device for feeding the end of the stamp strip forwardly and beyond the knife, and means for actuating the feeding device, of means actuated by the feed actuating means and adapted to contact with the front edge of the strip for registering the stamp perforations with respect to the shearing knife.

33. In a machine of the type set forth, the combination with stamp affixing means, the shearing knife, the device for feeding the stamp strip toward the knife, and means for actuating the feeding device, of means actuated by the feed actuating means and independent of the feeding means, for registering the stamp perforations with respect to the shearing knife.

34. In a machine of the type set forth, the combination with stamp affixing means, the shearing knife, means for feeding the stamp strip toward the knife, and means for operating the shearing knife, of means in addition to the feeding means actuated by the knife actuating means for registering the stamp perforations with respect to the knife.

35. In a machine of the type set forth, the combination with stamp affixing means, the shearing knife, strip-feeding means, and means for operating the shearing knife, of independent means automatically operated for adjusting said strip.

36. In a machine of the type set forth, the combination with stamp affixing means, the shearing knife, strip-feeding means, and means for operating the shearing knife, of means for adjusting said strip after the completion of the feeding operation.

37. In a machine of the type set forth, the combination with stamp affixing means, the shearing knife, strip-feeding means, and means for operating the shearing knife, of means independent of and in addition to the feeding means for automatically adjusting the strip.

38. In a machine of the type set forth, the combination with stamp affixing means, the shearing knife, strip-feeding means, and means for operating the shearing knife, of means independent of and in addition to the feeding means for adjusting the strip after the completion of the feeding operation.

39. In a machine of the type set forth, the combination with stamp affixing means, the shearing knife, strip-feeding means, and means for operating the shearing knife, of independent means automatically operated for adjusting said strip in a direction opposite to that in which it is fed.

In testimony whereof I have affixed my signature in presence of two witnesses.

CHARLES F. DAVIS.

Witnesses:
 HORATIO E. BELLOWS,
 ALFRED H. WHATLEY.